Patented Oct. 27, 1925.

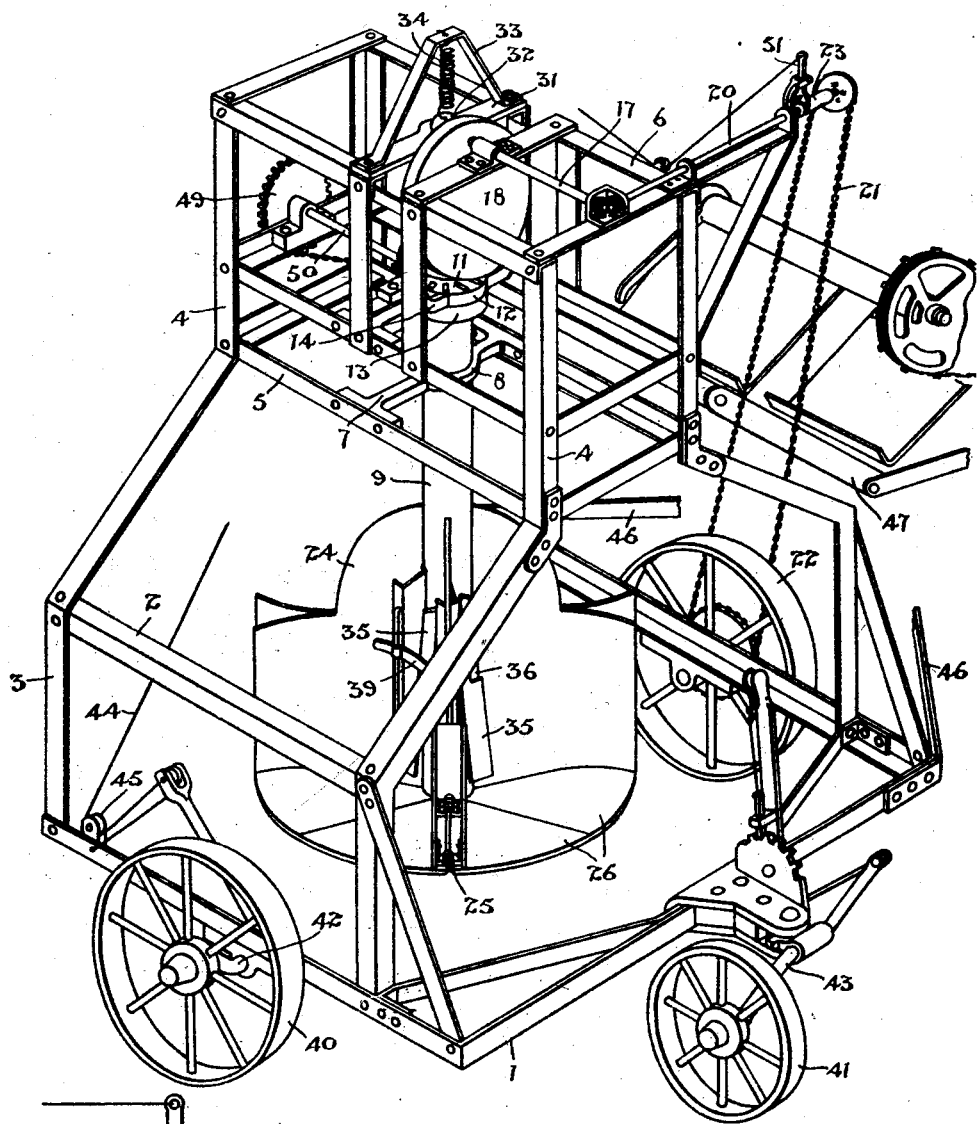
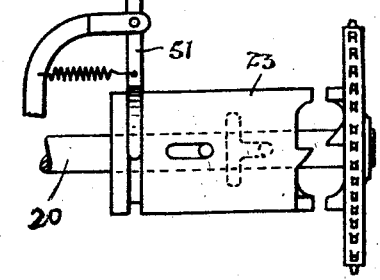
Fig.1.
Fig.7.
Inventor.
Thomas R. O'Brien

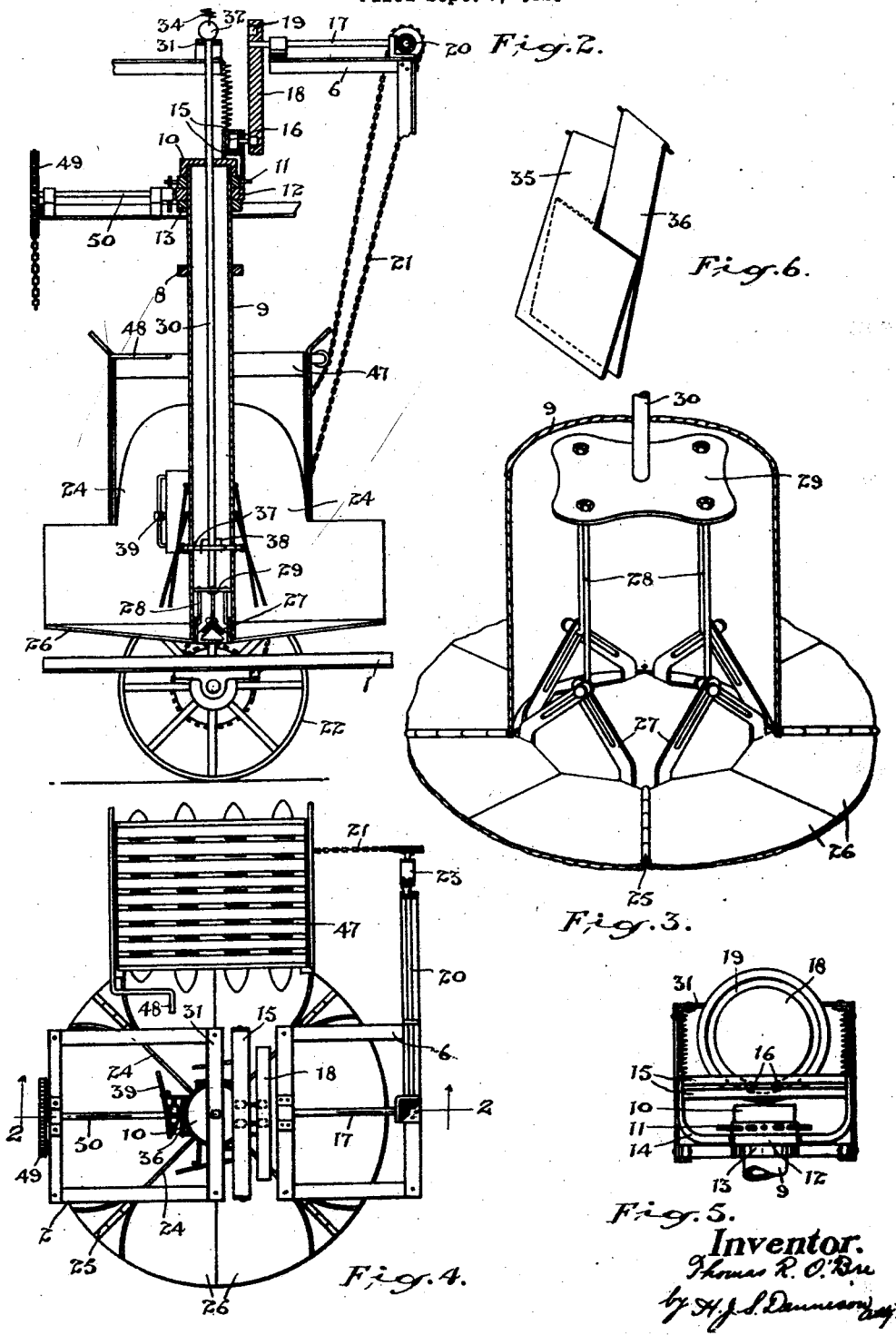

1,558,911

UNITED STATES PATENT OFFICE.

THOMAS RICHARD O'BRIEN, OF BUFFALO, NEW YORK, ASSIGNOR TO ALICE A. O'BRIEN, OF GUELPH, ONTARIO, CANADA.

SHOCKER.

Application filed September 9, 1921. Serial No. 499,588.

*To all whom it may concern:*

Be it known that I, THOMAS RICHARD O'BRIEN, a subject of the King of Great Britain, and resident of the city of Buffalo, State of New York, in the United States of America, have invented certain new and useful Improvements in Shockers, described in the following specification and illustrated in the accompanying drawings, that form part of the same.

The principal objects of the invention are, to facilitate the gathering of crops enabling the grain being harvested with the maximum speed.

A further object is to handle the grain with the least possible operations thereby avoiding the threshing out of the grain from the straw in the handling of same.

A still further object is to devise a simple mechanism of light weight which will be easily handled.

The principal features of the invention consist in the novel construction and arrangement of parts, whereby the sheaves are received in a vertical position upon a rotatable holder which is adapted to discharge the sheaves simultaneously upon their butts to form a shock.

In the drawings, Figure 1 is a perspective view of my improved shocker.

Figure 2 is a vertical sectional view through the sheaf holding member on the line 2—2 of Fig. 4 showing the sheaf delivering carrier toward one side.

Figure 3 is an enlarged perspective vertical sectional detail of the lower portion of the sheaf holding member showing the means for operating the drop bottoms for dumping the shock.

Figure 4 is a plan view of the top portion of the frame and shock holding member showing the sheaf carrier which delivers the sheaves to the holder.

Figure 5 is an elevational detail of the cam means for operating the central dumping member.

Figure 6 is a perspective detail of a pair of butt adjusting members carried on the sheaf holder.

Figure 7 is an enlarged plan detail of the clutch for operating the dumping mechanism.

In the accompanying drawings, the frame 1 is of substantially rectangular form open at one end and upon the sides of said frame is mounted the superstructure 2 formed of upright angle bars 3 bent inwardly and having the parallel vertical ends 4.

The outer extremities of the vertical ends 4 are connected by side and end bars forming a rigid rectangular frame 5 and a pair of rectangular frames 6 are supported by the upper ends of the bars 4, said latter pair of frames being spaced apart.

A transversely arranged member 7 in the lower frame 5 is formed with a central circular portion 8 in which is slidably arranged a vertical tubular member 9 and to the top end of this tubular member is secured a cap 10 below which is arranged a pin spur wheel 11. Below the spur wheel is loosely mounted a collar 12 held in place by a collar 13 fixed to the tube. The loose collar 12 is provided with laterally extending arms 14 shown particularly in Fig. 5. These arms extend upwardly and support a pair of transversely arranged bars 15 spaced apart and between which are mounted a pair of roller pins 16.

A horizontal shaft 17 is mounted on the top of one of the frames 6 and at the inner end of this shaft is secured a cam wheel 18 having a face groove 19 engaging the roller pins 16 so that upon the rotation of the shaft 17 the tube 9 will be raised or lowered.

The shaft 17 is driven by a transverse shaft 20 geared thereto and operated by means of a sprocket chain 21 geared to one of the supporting wheels 22.

A clutch 23 is arranged on the shaft 20 to connect said shaft with the driving sprocket when the shock holder is to be dumped by the raising of the tube 9. At the bottom of the tube 9 are arranged a plurality of radial sheet metal partitions 24 and these partitions are preferably formed of double plates at the bottom of which are supported the hinge members 25.

Upon each of the hinge members 25 is mounted a pair of segmental plates 26 which when they are arranged horizontally form a bottom for the reception of the butts of the sheaves and such bottom is divided intermediate between the radial partition so that upon the swinging downward of the segments the sheaf will be dropped to the ground.

In order to hold the segments 26 in the horizontal position each segment is provided with an arm 27 at the inner end.

These arms are of angular formation and are adapted to cross in pairs, the crossing ends being slotted to receive the ends of the perpendicular rods 28 which suspend on the plate 29 carried by a central rod 30.

The rod 30 extends through the cap at the top of the tube and is supported by the cross bar 31 of one of the frames 5, a stop 32 being provided on the upper end of said rod to limit its downward movement.

A truss 33 extends above the bar 31 and a coil tension spring 34 is supported by said truss and is connected at the top end of the rod 30 exerting a lifting force upon the rod. This lifting action is to provide for the quick return of the bottom plates to their closed position as will be hereinafter more fully described.

Attached to the tube 9 between each of the radial partitions 24 are the butt guide plates 35 and 36. These are arranged in pairs the one overlapping the other and are adapted to press outwardly in a slanting direction and to hold the butt from jamming in tight around the base of the tube.

Within the tube 9 are arranged a plurality of pivotal arms 37 back of the butt guides and the outer ends of these arms are provided with rollers to engage the butt guides and throw them outwardly. The inward ends of the arms 37 are engaged by fingers 38 secured to the rod 30 so that as the tube is raised the arms are tipped on their pivots allowing the butt guides to swing in close to the tube 9 so that they will not interfere with the free falling of the sheaves and as the rod and tube assume their normal position the guides are extended.

Guide members 29 are also secured to the tube 9 so that the first sheaves deposited in the compartments of the rotatable holder will be guided well back into the apex, thereby ensuring the maximum number of sheaves being grouped in each compartment.

The frame 1 is supported upon the wheels 22, 40 and 41 and the wheels 40 and 41 are arranged upon adjustable supports in the form of crank shafts 42 and 43.

The outside wheel 40 is preferably operated by the driver so as to alter the inclination of the machine by means of a cable 44 which is secured to the frame 1 and extends around a roller on the end of the crank axle and through a pulley 45 on the frame, from whence it extends up to the frame of the binder and is operated by a suitable lever which is not shown.

The frame 1 is connected in a suitable manner by the angularly extending arms 46 to the frame of the binder machine and the sheaves are carried from the binder deck upwardly on a conveyer 47 which extends over the frame 1 and in close to the central tube between the angle bars 3.

A crank rod 48 is provided at the end of the conveyer so that the head of the sheaves is engaged thereby to allow the butts to drop downwardly on to the supporting plates 26. The sheaves are deposited into the compartment of the sheaf carrier arranged opposite the conveyer and the carrier is rotated in unison with the operation of the machine by a pin gear 49 mounted on a horizontal shaft 50 in one of the upper frames 6 and said shaft is suitably driven from the binder mechanism.

The clutch 23 is operated by means of a spring held arm 51 having a cord connected thereto and is adapted to be operated by the driver of the vehicle when it is desired to dump the shock. On the clutch being thrown into operation it rotates the shafts 20 and 17 turning the cam wheel 18 to lift the tubular member 9. The lifting of the tubular member 9 draws the outward edges of the bottom segmental plates upward and the slotted arms 27 engage the rigid rods 28 tilting the said plates on their pivots, thus releasing the sheaves and allowing them to drop upon the ground butt down and the heads in together. The tube 9 is raised high enough so that the bottom segments clear the heads and the distance of travel is reduced by the action of the tension spring at the top of the centre rod pulling upward on the centre rod thereby swinging the segmental plates inward to meet the radial partitions on the centre tube while said tube is still raised.

In a machine such as described the sheaves are received in the shock forming holder in a vertical position and are retained in that position until the proper number of sheaves has been gathered together. The bottom of the holder is then released dropping the entire bundle butt down upon the ground with the heads inclined inwardly in such a manner as to form a snug and compact shock without the necessity of binding.

The operation of harvesting grain with a machine such as described will be greatly simplified and the cost will be reduced to the minimum.

What I claim as my invention is:—

1. A shocker, comprising a frame, a sheaf receptacle vertically disposed in said frame and rotatable therein and formed with rigid radial partitions, means for delivering the sheaves vertically to said receptable, means for rotating said receptacle, bottom plates hinged to said radial partitions, means for releasing the bottom plates allowing the sheaves to drop vertically from said receptacle, and means for raising the receptacle clear of the heads of the sheaves.

2. A shocker, comprising a frame, a tubular member suspended from the top of said frame and adapted to be rotated, means for rotating said tubular member, a plurality of radial partitions, a plurality of members hinged to said partitions and forming a bottom to said receptacle, arms connected to said hinged members, means connected to said arms for holding said hinged members in a horizontal position, and means for raising said receptacle to effect the swinging of said hinged members to release the sheaves.

3. A shocker, comprising a frame having a superstructure a tubular member rotatably supported in said superstructure and suspended therefrom, means for rotating said tubular member, a cam member supported in said superstructure adapted to raise and lower said tubular member, a plurality of radial partitions arranged at the lower end of said tubular member, a plurality of sector shaped plates hinged in pairs to said radial partitions, a rod extending through said tubular member and supported from the superstructure, and arms secured to said segmental plates and pivotally connected with said rod.

4. A shocker, comprising a frame supported upon wheels and adapted to be connected to the binder machine, a rotatable sheaf receptacle supported vertically in said frame and having a gear at the upper end, a shaft and gear mounted in the frame and driven from the binder machine and adapted to rotate said receptacle, hinged members forming a bottom to said receptacle, a rod extending vertically through the centre of said receptacle and connected at the lower end to said hinged members, a face cam horizontally journalled in said frame, means connecting said face cam with said receptacle to effect the raising and lowering of the receptacle when the cam is rotated, means for rotating said cam, and a clutch interposed in said rotating means adapted to effect the operation of said cam.

5. A shocker, comprising a frame, a tubular member vertically suspended from said frame, a plurality of radial partitions extending from said tubular member, segmental members hinged to said radial partitions and forming a bottom, means for raising said tubular member, means extending through said tubular member for swinging the hinged members upon the raising of the tubular member, butt guides hinged to said tubular members between said partitions, means pivotally connected to the tubular member adapted to swing said butt guides outwardly when said tubular member is in its lowered position, and means connected with the means for swinging the hinged members adapted to swing said pivotal members inwardly to allow the inward swinging of the butt guides as the receptacle is raised.

6. A shocker, comprising a frame, a vertical sheaf receptacle suspended in said frame, hinged members forming a bottom for said receptacle, a rod extending through said receptacle and connected with said hinged members, means for raising said receptacle, a superstructure over said frame and a tension spring connected with said rod and to said superstructure adapted to lift said rod following the raising of the receptacle to effect the return of the hinged members to their normal horizontal positions.

THOMAS RICHARD O'BRIEN.